United States Patent [19]

Shackelford, Sr.

[11] Patent Number: 4,534,579
[45] Date of Patent: Aug. 13, 1985

[54] AUTOMOBILE WHEEL LIFT FOR A TOW TRUCK

[76] Inventor: G. Raymond Shackelford, Sr., Rte. 2, Box 351, Augusta, Ga. 30909

[21] Appl. No.: 594,796

[22] Filed: Mar. 29, 1984

[51] Int. Cl.³ .............................................. B60P 3/06
[52] U.S. Cl. .................................... 280/402; 414/563
[58] Field of Search ............... 280/402; 414/563, 648; 212/199, 259, 212; 187/9 R

[56] References Cited

U.S. PATENT DOCUMENTS

| | | | |
|---|---|---|---|
| 1,520,194 | 12/1924 | Matthews | 414/563 |
| 2,183,478 | 12/1939 | Holmes et al. | 212/141 |
| 2,436,000 | 2/1948 | Fleming | 414/563 |
| 2,625,278 | 1/1953 | Sensenbaugh | 414/563 |
| 2,726,777 | 12/1955 | Wiley | 414/563 |
| 3,154,205 | 10/1964 | Gillem | 414/563 |
| 3,182,829 | 5/1965 | Wagner | 414/563 |
| 3,285,443 | 11/1966 | Gaumont | 414/563 |
| 3,434,607 | 3/1969 | Nelson | 414/563 |
| 3,434,608 | 3/1969 | Nelson | 414/563 |
| 3,490,627 | 1/1970 | Goldston, Jr. | 414/563 |
| 3,599,811 | 8/1971 | Watkins | 414/563 |
| 3,667,630 | 6/1972 | Scott | 414/563 |
| 3,719,294 | 3/1973 | Aquila | 414/563 |
| 3,924,763 | 12/1975 | Pigeon | 414/563 |
| 3,951,280 | 4/1976 | Peck | 414/563 |
| 4,264,262 | 4/1981 | Locodo | 414/563 |
| 4,384,817 | 5/1983 | Peterson | 414/563 |
| 4,451,193 | 5/1984 | Cannon, Jr. et al. | 414/563 |

FOREIGN PATENT DOCUMENTS 818771 9/1951 Fed. Rep. of Germany ...... 414/648

OTHER PUBLICATIONS

Dover Corp./Ernest Holmes Division, Universal Towing Carriage UTC-100, 1982.
Diversified Products Mfg. Co., Peterson Scoop (undated).

Primary Examiner—John A. Pekar
Attorney, Agent, or Firm—Roylance, Abrams, Berdo & Goodman

[57] ABSTRACT

A mechanical wheel lift for engaging and lifting the wheels of a car for use on a tow truck having a winch and a cable thereon. The wheel lift comprises a support coupled vertically to the rear of the truck, a pair of vertical tracks coupled to the support, a trolley vertically movable along the tracks, a pair of cam follower rollers coupled to the support, a pivot member pivotally coupled to the trolley and having a planar cam surface thereon slidably engaging and inclined to the cam follower rollers, and a pair of wheel-engaging forks coupled to the pivot member. The winch and cable vertically reciprocate the trolley to thereby vertically reciprocate the forks. During this movement, the pivot member pivots the forks towards or away from the truck. The wheel lift is stowable, can be used without removal of tow slings and avoids the use of hydraulics.

23 Claims, 9 Drawing Figures

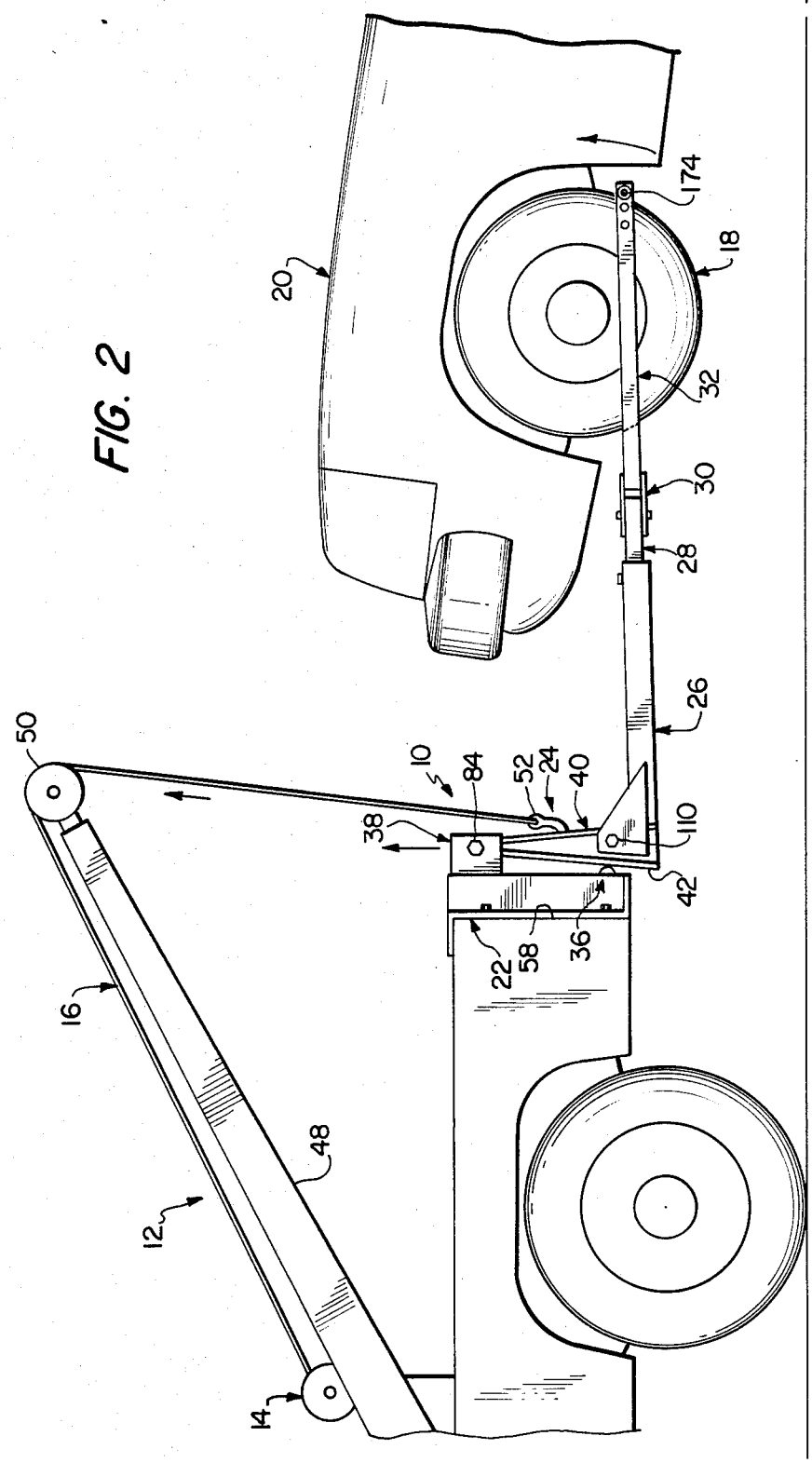

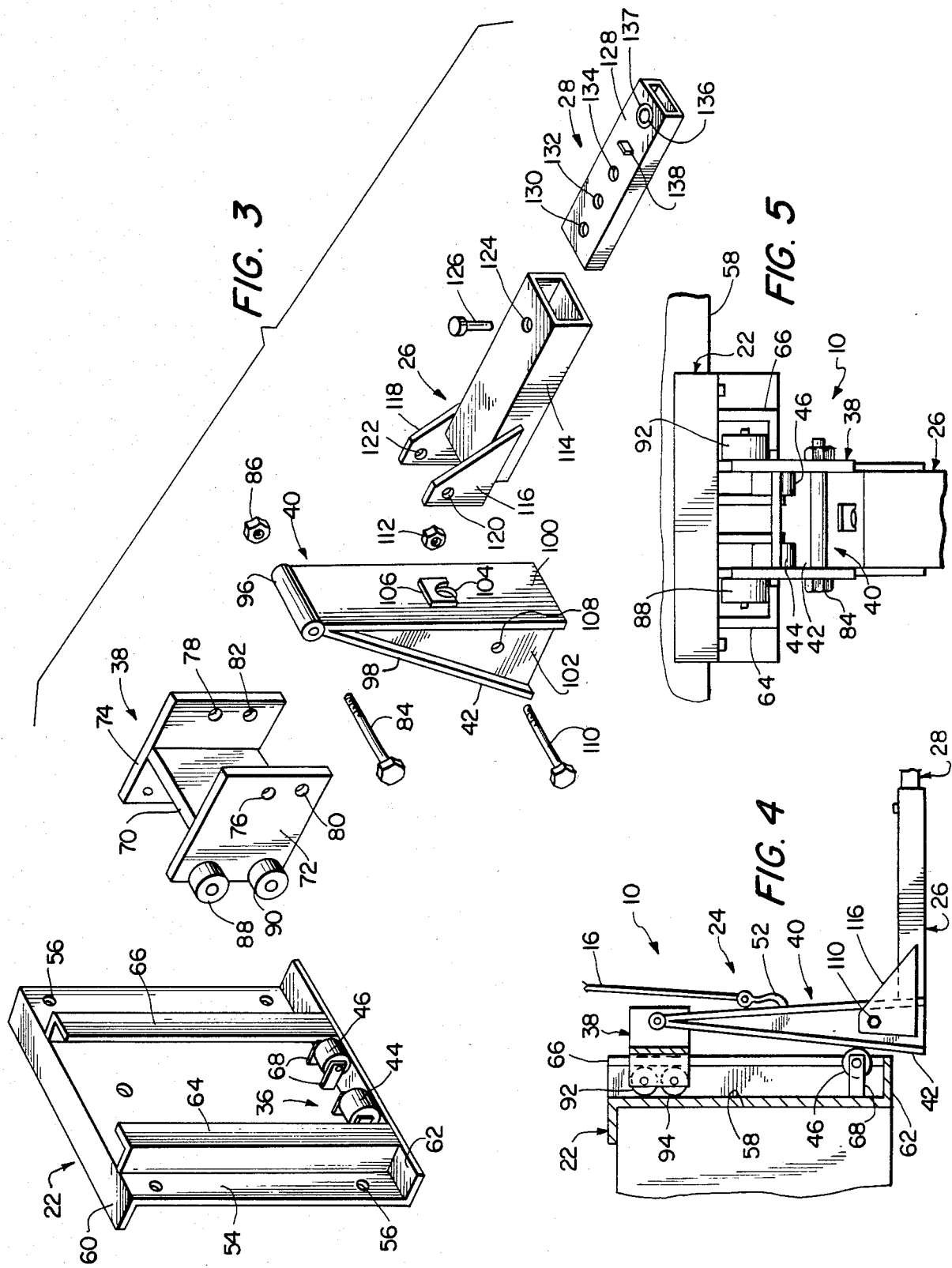

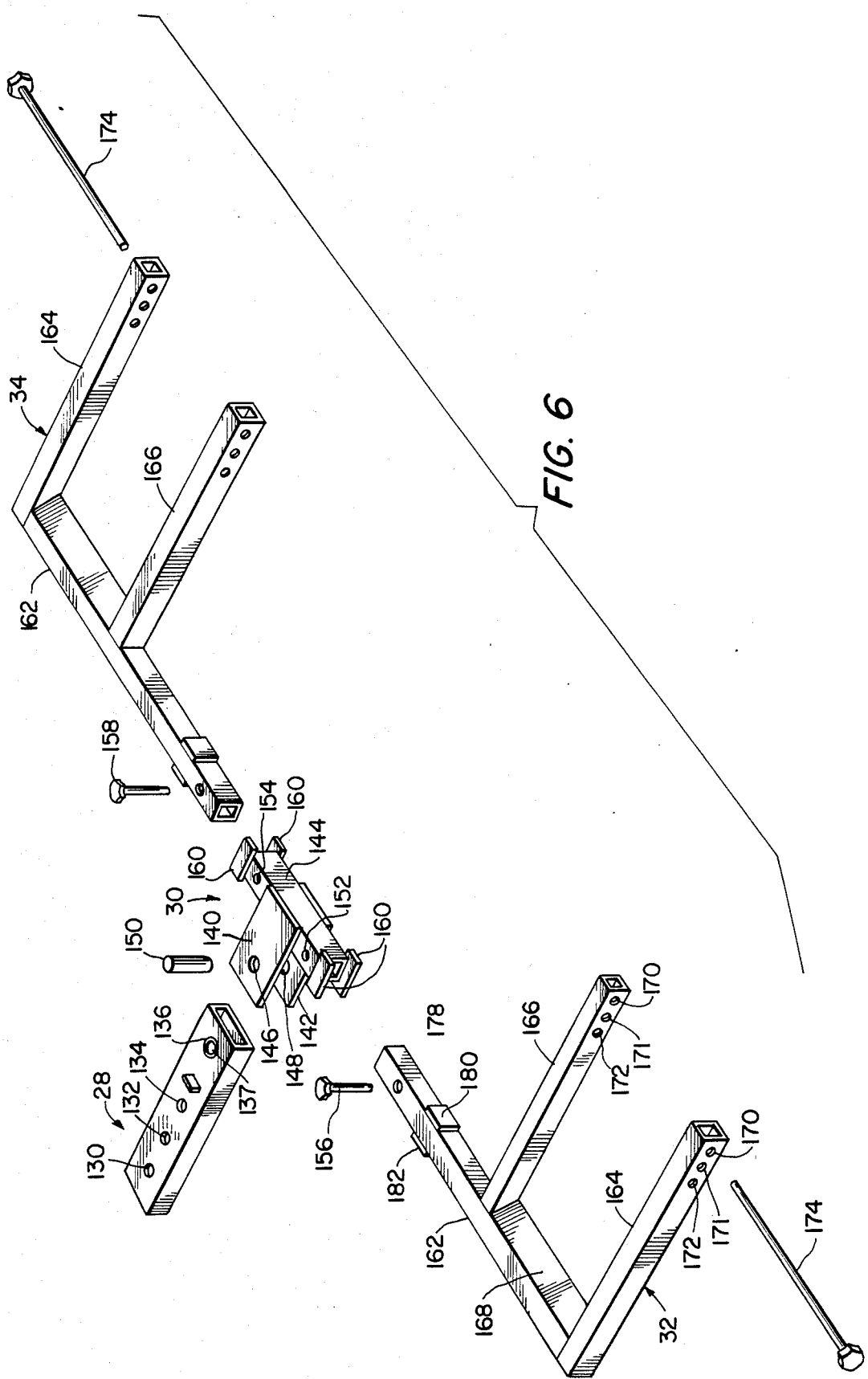

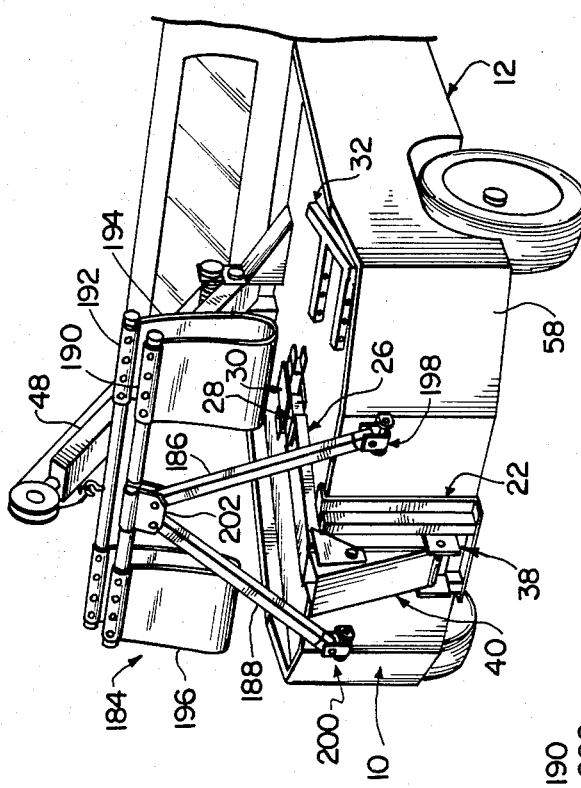
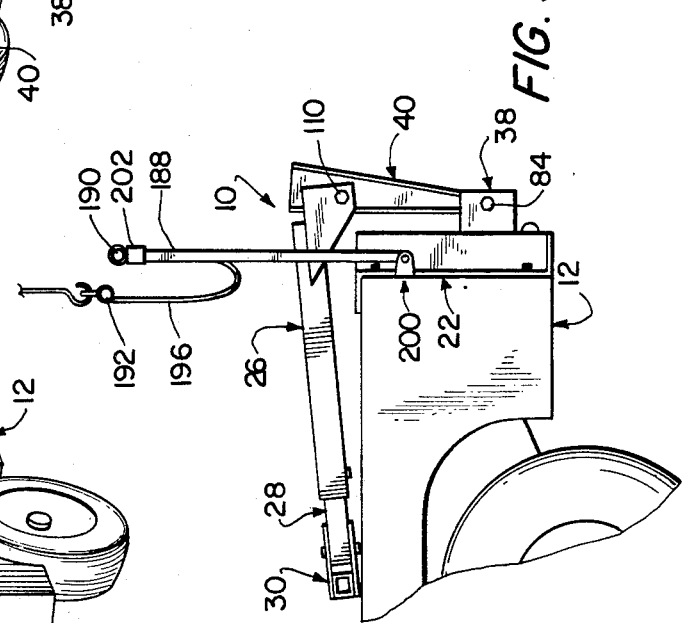
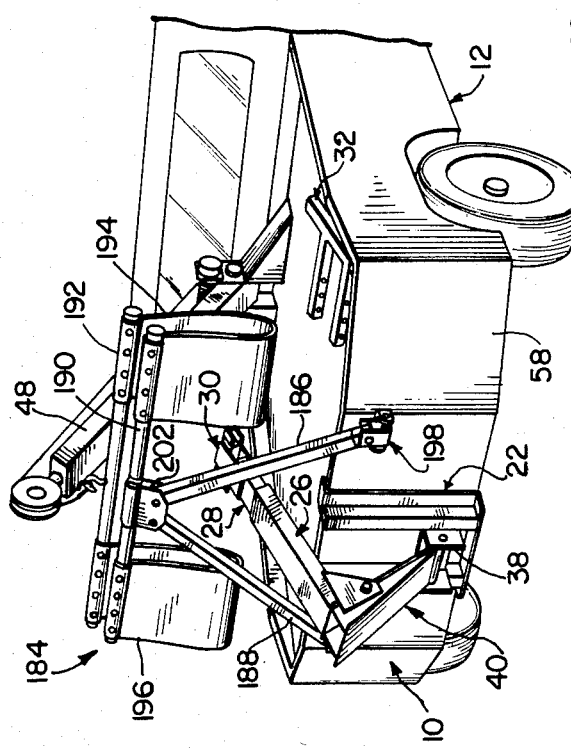

4,534,579

AUTOMOBILE WHEEL LIFT FOR A TOW TRUCK

FIELD OF THE INVENTION

The invention relates to an automobile wheel lifting apparatus for use with a two truck. More particularly, the invention relates to a wheel lifting apparatus which includes a mechanical camming assembly for pivoting wheel-engaging forks that avoids the use of hydraulics, and which includes an articulated construction enabling use without removal of tow slings.

BACKGROUND OF THE INVENTION

Tow trucks for towing disabled or ticketed automobiles have traditionally used tow slings for engaging and lifting the automobile. Some of the newer domestic and foreign automobiles cannot be towed this way because of damage to the automobile. Accordingly, in recent years wheel engaging and lifting devices have been used in connection with tow trucks to avoid use of tow slings.

However, many of these wheel lift devices have significant disadvantages. For example, they require the use of hydraulics, which is expensive and is prone to leaking. In addition these devices are usually complex and suffer from numerous breakdowns. Moreover, these wheel lift devices are usually not easily stowable and the tow slings must be removed before they can be used.

Examples of these devices are disclosed in the following U.S. Pat. Nos. 2,183,478 to Holmes et al; 2,436,000 to Fleming; 2,625,278 to Sensenbaugh; 3,434,607 to Nelson; 3,434,608 to Nelson; 3,490,627 to Goldston, Jr.; 3,599,811 to Watkins; and 4,384,817 to Peterson.

Thus, there is a continuing need for improvement in wheel lift devices for use with tow trucks.

SUMMARY OF THE INVENTION

Accordingly, a primary object of the invention is to provide an automobile wheel lift for a tow truck which avoids the use of hydraulics and instead can be activated by using the existing winch and cable on the tow truck.

Another object of the invention is to provide such a wheel lift that is simple and durable and which is easily stowed.

Another object of the invention is to provide such a wheel lift that can be used without removing the traditional tow slings.

A further object of the invention is to provide such a wheel lift that uses a mechanical cam and cam follower for pivoting wheel-engaging forks to more securely support the automobile on the wheel lift.

The foregoing objects are basically attained by providing a mechanical wheel lift for engaging and lifting the wheels of a car for use on a tow truck having a winch and a cable thereon, the combination comprising a support rigidly coupled in a substantially vertical position on the rear of the truck; a cam follower coupled to the support; a pair of wheel-engaging forks; and a lifting assembly, coupled to the wheel-engaging forks, slidably coupled to the support, and coupled to the cable on the winch, for reciprocating the wheel-engaging forks upwardly and downwardly and for pivoting the wheel-engaging forks towards and away from the rear of the truck upon reeling-in and paying-out of the cable, this lifting assembly including a cam surface slidably engaging the cam follower.

Advantageously, the cam follower comprises a pair of rollers rotatably coupled to the vertical support and the cam surface comprises a planar surface that is inclined relative to the cam follower rollers.

In addition, the lifting assembly includes an articulated construction allowing its various parts to pivot relative to one another so that it can be stowed or used without removal of tow slings that are also mounted on the truck.

Other objects, advantages and salient features of the invention will become apparent from the following detailed description, which, taken in conjunction with the annexed drawings, discloses a preferred embodiment of the invention.

DRAWINGS

Referring now to the drawings which form a part of this original disclosure:

FIG. 2 is a side elevational view similar to that shown in FIG. 1 except that the mechanical wheel lift has been activated so as to move upwardly and pivot towards the rear of the truck, thereby engaging and lifting the wheels of the automobile;

FIG. 3 is an exploded, enlarged perspective view of various parts of the mechanical wheel lift in accordance with the invention including the support, the trolley, the pivot member, the boom and the boom extension;

FIG. 4 is a side elevational view in longitudinal section of the wheel lift in the position shown in FIG. 2;

FIG. 5 is a top plan view of the wheel lift shown in FIG. 4;

FIG. 6 is an enlarged perspective view of additional parts forming the mechanical wheel lift including the boom extension, the pivot assembly, and the left and right wheel-engaging forks;

FIG. 7 is a fragmentary right rear perspective of the tow truck having a tow sling assembly thereon and the wheel lift being stowed between a pair of tow sling arms;

FIG. 8 is fragmentary right rear perspective similar to that shown in FIG. 7 except the wheel lift is fully stowed; and FIG. 9 is a fragmentary side elevational view of the wheel lift in its stowed position.

DETAILED DESCRIPTION OF THE INVENTION

Figure 1:
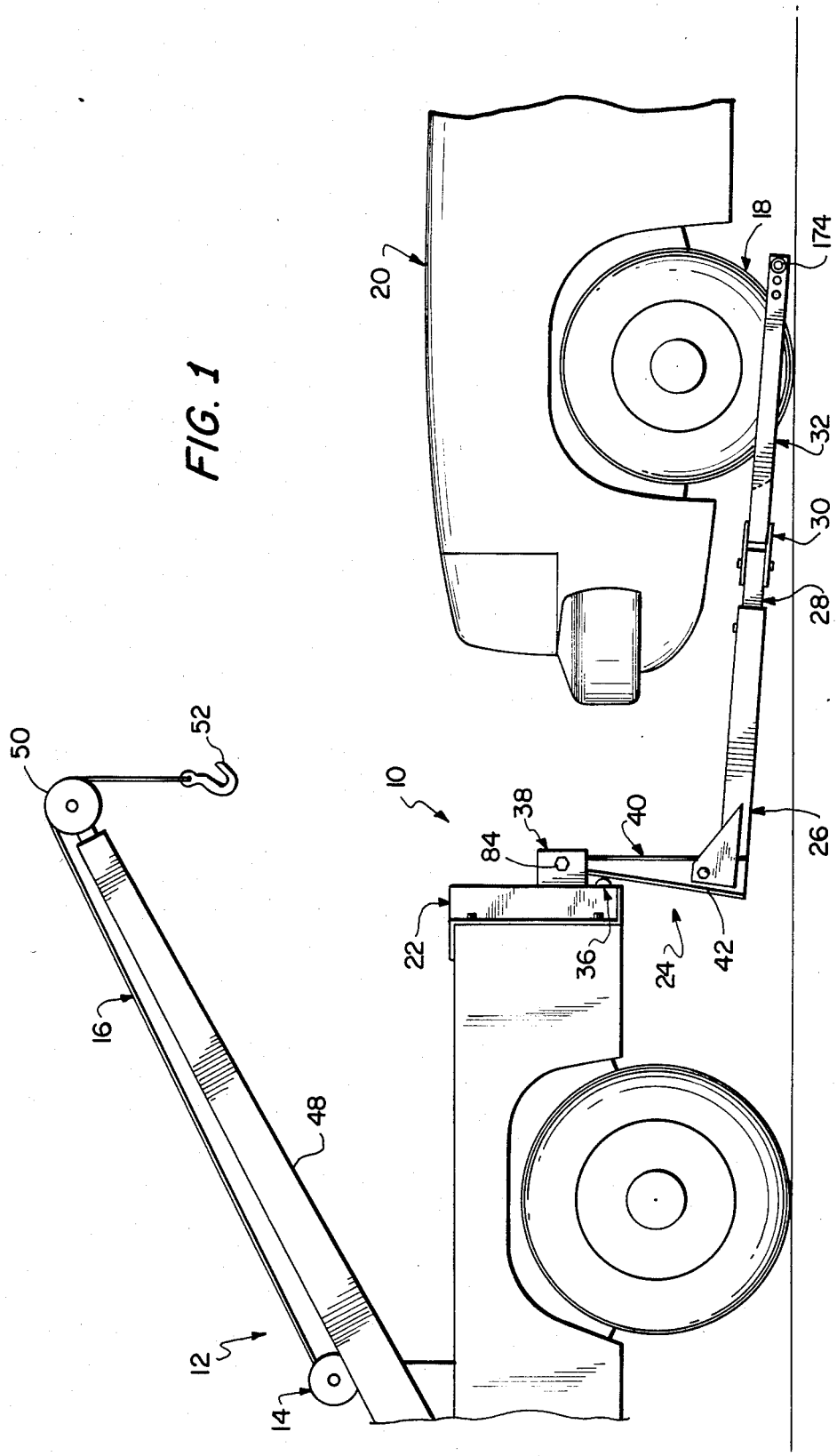
FIG. 1 is a side elevational view of the mechanical wheel lift in accordance with the invention coupled centrally to the rear of a tow truck and about to engage the wheels on an automobile.

As seen in FIGS. 1 and 2, the mechanical wheel lift 10 in accordance with the invention is intended for use with a tow truck 12 having a winch 14 and a cable 16 for engaging and lifting the wheels 18 of an automobile 20. The wheel lift comprises a support 22, a lifting assembly 24, a boom 26, a boom extension 28, a pivot assembly 30, a left wheel-engaging fork 32, and a right wheel-engaging fork 34, as seen in FIG. 6. A cam follower 36 is coupled to the support 22 and the lifting assembly 24 comprises a trolley 38 and a pivot member 40, this pivot member having a planar cam surface 42 for engagement with the cam follower 36 comprising rollers 44 and 46, as seen in FIGS. 3–5.

Thus, the lifting assembly 24, via action of the winch 14 and cable 16, reciprocates the wheel-engaging forks 32 and 34 upwardly and downwardly and pivots these forks towards and away from the rear of the truck upon reeling-in and paying-out of the cable via engagement of the cam surface 42 with the cam follower rollers 44 and 46, as disclosed in more detail hereinafter.

As seen in FIGS. 1 and 2, the winch 14 is supported adjacent the base of a crane 48 which is fixed to the truck 12 and has a pulley 50 at the end over which the cable 16 extends. At the end of the cable is a hook 52 for engaging the lifting assembly 24 as seen in FIG. 2. When the cable 16 is payed-out the lifting assembly 24 is moved downwardly, and when the cable is reeled-in the lifting assembly is moved upwardly.

Turning now to FIGS. 3–5, the support 22 is basically comprised of a vertical rectangular wall 54 which has a suitable number of apertures 56 therein for receiving bolts to thereby rigidly couple the support 22 vertically to the rear wall 58 of the truck. Coupled at the top of the vertical wall 54 is a forwardly extending horizontal flange 60 for engaging the top of the rear of the truck and at the bottom is a rearwardly extending horizontal flange 62. Advantageously, the support, as well as the remaining parts of the mechanical wheel lift, are formed from sturdy metal, such as steel, and the various parts that are rigidly connected are welded or otherwise suitably coupled. In addition, while not shown for reasons of clarity, additional supporting members can be used to reinforce the various parts as shown in FIGS. 1–6.

Rigidly coupled to wall 54 on the support are two tracks 64 and 66 in the form of facing L-shaped members which are vertical and parallel. The bottoms of these tracks are supported on the lower flange 62, and located between and near the bottom of these tracks are the two cam follower rollers 44 and 46, which are rotatably supported via brackets 68 for rotation about horizontal axes. Brackets 68 are suitably rigidly coupled to the wall 54 and these cam follower rollers extend outwardly past the rearmost part of the tracks 64 and 66, as seen in FIGS. 1, 2 and 4.

Referring again to FIG. 3, as noted above, the lifting assembly 24 is comprised of the trolley 38 and the pivot member 40. The trolley 38 is a substantially T-shaped assembly formed from a rectangular central wall 70 and left and right side walls 72 and 74 which are parallel and which are rigidly coupled to opposite ends of the central wall. The left and right side walls have a first pair of coaxial bores 76 and 78 and a second pair of coaxial bores 80 and 82 at their ends spaced from the central wall for the pivotal reception of bolt 84 which has an associated nut 86. This bolt 84 pivotally couples the pivot member 40 to the trolley 38 and allows pivoting through at least 180°. Two pairs of bores are formed in the trolley to provide an adjustment as necessary. Located on the other side of the central wall of the trolley and located on the outer surfaces of the left and right side walls are a first pair of wheels 88 and 90, which are rotatably supported on suitable horizontal, vertically aligned shafts rigidly coupled and extending outwardly from the left side wall 72. Similarly, extending outwardly from the right side wall are a second pair of wheels 92 and 94, as seen in FIG. 4. These two pairs of wheels, as seen in FIGS. 4 and 5, rotatably engage the tracks 64 and 66 as well as the rear wall 54 of the support and thus allow the trolley to vertically reciprocate along the tracks.

As seen in FIG. 3, the pivot member 40 comprises a tube 96, a pair of plates 98 and 100 rigidly coupled to the tube and extending downwardly therefrom at an angle therebetween of about 20°, and a pair of triangular support plates 102 between and rigidly coupled to plates 98 and 100, only one plate 102 being shown in FIG. 3. Each of these plates 98 and 100 are planar and rectangular, with the outer surface of the rear plate 98 forming the cam surface 42. The front plate 100 has an aperture 104 centrally located therein for reception of the hook 52, this aperture being reinforced by a plate 106. The tube 96 at the top of the pivot member 40 pivotally receives the bolt 84 so as to pivotally couple the pivot member to the trolley. Each of the triangular support plates 102 has coaxial bores 108, only one being shown in FIG. 3, for the reception of a bolt 110 for pivotally coupling the boom 26 to the pivot member 40 for pivoting through only 90°, this bolt having an associated nut 112.

The boom 26 as seen in FIG. 3 comprises a tube 114 having a rectangular cross section and having a pair of flanges 116 and 118 rigidly coupled at the rear thereof, these flanges having respectively a pair of coaxial bores 120 and 122 for the pivotal reception of bolt 110 therein to thereby pivotally couple the boom 26 to the pivot member 40. A pair of bores 124, only one being shown in FIG. 3, are located near the front of the boom 26 in its top and bottom walls for the reception of a pin or bolt 126, this pin being used to adjustably receive the boom extension 28 in the boom.

The boom extension 28, as seen in FIGS. 3 and 6, comprises a tube 128 having a rectangular cross section and being slidably receivable on the inside of tube 114 in the boom 26. The boom extension has four pairs of vertically oriented bores 130, 132, 134 and 136, only the upper ones being seen in FIGS. 3 and 6, formed in the upper and lower surfaces of the tube 128. Bores 130, 132 and 134 selectively receive pin 126 so as to adjustably couple the boom extension 28 to the boom 26. A stop 138 is rigidly coupled to the top of the boom extension between bores 134 and 136 to limit inward insertion of the extension into the boom. Bores 136 receive a sleeve 137 therein, which is welded vertically in place.

Turning now to FIG. 6, the pivot assembly 30 is shown comprised of a pair of horizontally oriented, rectangular plates 140 and 142 which are rigidly coupled at adjacent ends to the top and bottom of a cross tube 144 having a rectangular cross section. Plates 140 and 142 have vertically oriented, coaxial bores 146 and 148 for the reception of a cylindrical pin 150, which is also received in sleeve 137 in the boom extension 28 to thereby pivotally couple the pivot assembly 30 to the boom extension 28 about a vertical axis. Pin 150 is welded at its opposite ends to plates 140 and 142 to prevent it from falling out of sleeve 137.

The cross tube 144 has two pairs of vertically oriented coaxial bores 152 and 154 passing through the upper and lower walls thereof for the respective reception of pins or bolts 156 and 158 to removably couple the left and right wheel-engaging forks 32 and 34 to the pivot assembly 30. At opposite ends of the cross tube 144 are flanges 160 rigidly coupled at the top and bottom to reinforce the connection of the forks to the cross tube. Alternatively, flanges 160 can be coupled to the sides of tube 144.

The two wheel-engaging forks 32 and 34 are mirror images, so only the left fork 32 will be described in detail. Thus, fork 32 comprises a tube 126 having a rectangular cross section and having a pair of arms 164 and 166 rigidly coupled thereto and extending rearwardly in substantially a single plane. A plate 168 is rigidly coupled to tube 162 as well as arms 164 and 166 at an inclined angle to receive the curved outer circumference of the wheel 18 from the automobile. At the distal ends of the arms are a set of apertures 170-172 for the adjustable reception of headed pin 174 which closes off the space between the adjacent arms 164 and 166 and engages automobile wheel 18. Adjacent the end of tube 162, which is received in cross tube 144, are a pair of vertically oriented coaxial bores 178 for the reception of pin 156. Spaced from these bores towards arm 166 are a pair of flanges 180 and 182 which are rigidly coupled on opposed vertical sides of tube 162 for engagement with the end of the cross tube 144 in between flanges 160. If flanges 160 are located on the sides of tube 144 as mentioned above, then flanges 180 and 182 can be located on the tops and bottoms of tubes 162.

OPERATION

As seen in FIG. 1, in order to begin the process of lifting the front wheels 18 of the automobile 20, the lifting assembly 24 comprised of the trolley 38 and pivot member 40 are positioned near the bottom of the support 22 so that the wheel-engaging forks are adjacent the ground and are located in a position for receiving each wheel. As seen in FIG. 1, the boom 26, boom extension 28, pivot assembly 30 and left wheel-engaging fork 32 lie in substantially the same plane which is oriented at an acute angle with the planar cam surface 42 on the pivot member 40. In this position, under the influence of gravity, the cam surface 42 is engaged with the cam follower 36, formed by rollers 44 and 46 as seen in FIGS. 3-5. In this position, the cam surface 42 is also inclined to the vertical and is inclined to the cam follower 36. Thus, since the trolley 38 can move only vertically along tracks 64 and 66, since wheels 88, 90, 92 and 94 are located between the tracks and rear wall 54, upward movement of the trolley 38 results in a camming action of the cam surface 42 as it slides along rollers 44 and 46. This camming action causes the pivot member 40, as well as the boom 26, boom extension 28, pivot assembly 30 and the wheel-engaging forks, to pivot counterclockwise towards the rear of the truck.

This occurs as seen in FIG. 2 after the cable 16 is attached via hook 52 to aperture 104 in the pivot member and this cable is reeled-in via actuation of winch 14. Thus, upon actuation of the winch, the trolley moves upwardly and the pivot member pivots away from the rear of the truck, causing the wheel-engaging forks to move upwardly and to pivot towards the rear of the truck. This allows the pins 174 on the two forks to be located higher on each wheel 18 than the plates 168, thereby assuring a good connection of the wheels to the forks.

To release the automobile 20 from the wheel lift, once its destination is reached, the cable 16 is payed-out and the trolley moves downwardly and the wheel-engaging forks pivot away from the rear of the truck back to the position shown in FIG. 1.

As is clear from FIG. 6, the wheel-engaging forks 32 and 34 can be removed from the pivot assembly 30 for easy storage in the rear of the truck as seen in FIGS. 7 and 8. Moreover, since pivot assembly 30 is pivotally coupled to boom extension 28, the two forks can be pivoted relative to the boom extension to engage the wheels of an automobile that is not aligned with the rear of the tow truck.

Moreover, since the boom 26 is pivotally coupled to the pivot member 40 and the pivot member 40 is in turn pivotally coupled to the trolley, the combination of the pivot member 40, boom 26, boom extension 28 and pivot assembly 30 can be quite easily stowed on the rear of the truck by means of pivoting these various parts along their various pivotal connections, as indicated in FIGS. 7-9.

Since the wheel lift 10 is located on the very rearmost part of the truck and in the center thereof, it will not interfere with any tow sling apparatus and therefore the tow sling does not have to be removed in order to use or stow the mechanical wheel lift.

This is clearly illustrated in FIGS. 7-9 where tow truck 12 is shown supporting a tow sling assembly 184 in addition to the wheel lift 10. The tow sling assembly comprises a pair of tow sling arms 186 and 188, a pair of cross tubes 190 and 192, and a pair of slings 194 and 196 supported between the tubes. Arms 186 and 188 are pivotally coupled at their first ends, via pivot mechanisms 198 and 200, to the rear wall 58 of the truck and are coupled at an acute angle at their second ends via coupling 202.

Thus, boom 26, boom extension 28 and pivot assembly 30 can be maneuvered through the tow sling arms 186 and 188, after release of the wheel-engaging forks 32 and 34, by means of pivoting the pivot member 40 relative to the trolley 38 and the boom 26 relative to the pivot member about pins 84 and 110, respectively. This means that the mechanical wheel lift 10 can be stowed as in FIGS. 8 and 9 or moved to its active position as in FIG. 1 without removing the tow sling apparatus. And this is highly advantageous since the tow truck operator usually does not know which towing device, i.e., the wheel lift or the tow sling, is needed when dispatched to tow a disabled vehicle.

While one advantageous embodiment has been chosen to illustrate the invention, it will be understood by those skilled in the art that various changes and modifications can be made therein without departing from the scope of the invention as defined in the appended claims.

What is claimed is:

1. A mechanical wheel lift for engaging and lifting the wheels of a car for use on a tow truck having a winch and a cable thereon, the combination comprising:
    a support rigidly coupled in a substantially vertical position on the rear of the truck;
    means defining a cam follower coupled to said support;
    a pair of wheel-engaging forks; and
    lifting means, coupled to said wheel-engaging forks slidably coupled to said support, and coupled to the cable on the winch, for reciprocating said wheel-engaging forks upwardly and downwardly and for pivoting said wheel-engaging forks towards and away from the rear of the truck upon reeling-in and paying-out of the cable,
    said lifting means including a cam surface slidably engaging said cam follower,
    said support including a pair of vertical tracks, and
    said lifting means including a trolley coupled to said tracks for vertical reciprocating movement,
    said cam surface being planar and being pivotally coupled to said trolley about a horizontal axis,
    said cam surface extending at an acute angle downwardly and towards said cam follower under the influence of gravity.

2. A mechanical wheel lift according to claim 1, wherein
said trolley includes a pair of wheels rotatably engaging said tracks.
3. A mechanical wheel lift according to claim 1, wherein
said lifting means further includes a pivot member pivotally coupled to said trolley and having said cam surface thereon.
4. A mechanical wheel lift according to claim 3, wherein
said wheel-engaging forks are coupled to said pivot member.
5. A mechanical wheel lift according to claim 3, wherein
said pivot member is coupled to the cable carried by the winch.
6. A mechanical wheel lift according to claim 3, wherein
said cam follower comprises a roller engaging said cam surface.
7. A mechanical wheel lift according to claim 1, and further comprising
a boom pivotally coupled about a horizontal axis to said lifting means and coupled to said wheel-engaging forks.
8. A mechanical wheel lift according to claim 7, and further comprising
a pivot assembly pivotally coupled about a vertical axis to said boom and coupled to said wheel-engaging forks.
9. A mechanical wheel lift according to claim 1, wherein
said wheel-engaging forks lie in a plane oriented at an acute angle to said cam surface.
10. A mechanical wheel lift for engaging and lifting the wheels of a car for use on a tow truck having a winch and a cable thereon, the combination comprising:
a support rigidly coupled in a substantially vertical position on the rear of the truck;
a pair of opposed substantially vertical and parallel tracks rigidly coupled to the support;
a trolley coupled to said tracks for vertical, reciprocating movement;
roller means rotatably coupled to said support;
a pivot member pivotally coupled to and extending below said trolley; and
a pair of wheel-engaging forks, coupled to and extending from said pivot member, for engaging the wheels of a car,
said pivot member being coupled to the cable for vertical, reciprocating movement upon reeling-in and paying-out of the cable, thereby vertically reciprocating said wheel-engaging forks,
said pivot member having a cam surface means, slidably engaging said roller means, for pivoting said wheel-engaging forks towards and away from the rear of the truck upon reeling-in and paying-out of the cable.
11. A mechanical wheel lift according to claim 10, wherein
said trolley comprises a plurality of wheels rotatably engaging said tracks.
12. A mechanical wheel lift according to claim 10, and further comprising
a boom pivotally coupled about a horizontal axis to said pivot member and coupled to said wheel-engaging forks.
13. A mechanical wheel lift according to claim 10, wherein
said cam surface means comprises a planar surface oriented at an acute angle to the plane containing said wheel-engaging forks.
14. A mechanical wheel lift for engaging and lifting the wheels of a car for use on a tow truck also having pair of tow sling arms pivotally coupled on the rear wall of the truck and engaging together at an angle, the combination comprising:
a support rigidly coupled on the rear wall of the truck;
a trolley coupled to said support for vertical reciprocating movement;
a member;
first pivot means for pivotally coupling said member to said trolley about a transverse horizontal axis;
a boom;
second pivot means for pivotally coupling said boom to said member about a second transverse horizontal axis, said second pivot means including means for limiting the pivotal movement of said boom relative to said member to about 90° in one direction and for allowing said boom to pivot towards said member in the other direction;
a pair of wheel-engaging forks;
means for releasably coupling said pair of wheel-engaging forks to said boom; and
power means, coupled to the truck, for reciprocating said trolley, member and boom upwardly and downwardly, thereby vertically reciprocating said wheel-engaging forks,
said boom being maneuverable through said tow sling arms, after release of said wheel-engaging forks from said boom, by means of pivoting said member relative to said trolley and said boom relative to and towards said member.
15. A mechanical wheel lift according to claim 14, wherein
said first pivot means includes means for allowing the pivotal movement of said member relative to said trolley through at least 180°.
16. A mechanical wheel lift for engaging and lifting the wheels of a car for use on a tow truck also having a pair of tow sling arms pivotally coupled on the rear wall of the truck and engaged together at an angle, the combination comprising:
a support rigidly coupled on the rear wall of the truck;
a trolley coupled to said support for vertical reciprocating movement;
a lifting assembly;
pivot means for pivotally coupling said lifting assembly to said trolley;
a pair of wheel-engaging forks;
means for releasably coupling said pair of wheel-engaging forks to said lifting assembly; and
power means, coupled to the truck, for reciprocating said trolley and lifting assembly upwardly and downwardly, thereby vertically reciprocating said wheel-engaging forks,
said lifting assembly being maneuverable through said tow sling arms, after release of said wheel-engaging forks from said lifting assembly, by means of pivoting said lifting assembly relative to said trolley,
said support including means defining a cam follower, said lifting assembly including a cam surface slidably engaging said cam follower upon vertical reciprocation of said lifting assembly, said cam surface being planar and being pivotally coupled to said trolley about a horizontal axis, said cam surface extending at an acute angle downwardly and towards said cam follower under the influence of gravity.

17. A mechanical wheel lift for engaging and lifting the wheels of a car for use on a tow truck having a winch and a cable thereon, the combination comprising:

a support rigidly coupled in a substantially vertical position on the rear of the truck;

means defining a cam follower coupled to said support;

a pair of wheel-engaging forks; and lifting means, coupled to said wheel-engaging forks, coupled to said support, and coupled to the cable on the winch, for reciprocating said wheel-engaging forks upwardly and downwardly and for pivoting said wheel-engaging forks towards and away from the rear of the truck upon reeling-in and paying-out of the cable, said lifting means including a cam surface slidably engaging said cam follower, said cam surface being planar and being pivotally coupled to said support about a horizontal axis, said cam surface extending at an acute angle downwardly and towards said cam follower under the influence of gravity.

18. A mechanical wheel lift according to claim 17, wherein said lifting means further includes a pivot member pivotally coupled to said support and having said cam surface thereon.

19. A mechanical wheel lift according to claim 17, wherein said cam follower comprises a roller engaging said cam surface.

20. A mechanical wheel lift according to claim 17, wherein said wheel-engaging forks lie in a plane oriented at an acute angle to said cam surface.

21. A mechanical wheel lift for engaging and lifting the wheels of a car for use on a tow truck also having a pair of tow sling arms pivotally coupled on the rear wall of the truck and engaged together at an angle, the combination comprising:

a support rigidly coupled on the rear wall of the truck;

a member;

first pivot means for pivotally coupling said member to said support about a transverse horizontal axis;

a boom;

second pivot means for pivotally coupling said boom to said member about a second transverse horizontal axis, said second pivot means including means for limiting the pivotal movement of said boom relative to said member to about 90° in one direction and for allowing said boom to pivot towards said member in the other direction;

a pair of wheel-engaging forks;

means for releasably coupling said pair of wheel-engaging forks to said boom; and power means, coupled to the truck, for reciprocating said member and boom upwardly and downwardly, thereby vertically reciprocating said wheel-engaging forks, said boom being maneuverable through said tow sling arms, after release of said wheel-engaging forks from said boom, by means of pivoting said member relative to said support and said boom relative to and towards said member.

22. A mechanical wheel lift according to claim 21, wherein said first pivot means includes means for allowing the pivotal movement of said member relative to said support through at least 180°.

23. A mechanical wheel lift for engaging and lifting the wheels of a car for use on a tow truck also having a pair of tow sling arms pivotally coupled on the rear wall of the truck and engaged together at an angle, the combination comprising:

a support rigidly coupled on the rear wall of the truck;

a lifting assembly;

pivot means for pivotally coupling said lifting assembly to said support;

a pair of wheel-engaging forks;

means for releasably coupling said pair of wheel-engaging forks to said lifting assembly; and power means, coupled to the truck, for reciprocating said lifting assembly upwardly and downwardly, thereby vertically reciprocating said wheel-engaging forks, said lifting assembly being maneuverable through said tow sling arms, after release of said wheel-engaging forks from said lifting assembly, by means of pivoting said lifting assembly relative to said support, said support including means defining a cam follower, said lifting assembly including a cam surface slidably engaging said cam follower upon vertical reciprocation of said lifting assembly, said cam surface being planar and being pivotally coupled to said support about a horizontal axis, said cam surface extending at an acute angle downwardly and towards said cam follower under the influence of gravity.

* * * * *

UNITED STATES PATENT AND TRADEMARK OFFICE
CERTIFICATE OF CORRECTION

PATENT NO. : 4,534,579

DATED : August 13, 1985

INVENTOR(S) : G. Raymond Shackelford, Sr.

It is certified that error appears in the above-identified patent and that said Letters Patent is hereby corrected as shown below:

```
Claim 1, line 9, after "forks" insert -- , --.
Claim 14, line 2, after "having" insert -- a --.
Claim 14, line 4, change "engaging" to -- engaged --.
```

Signed and Sealed this

Twenty-first Day of January 1986

[SEAL]

Attest:

DONALD J. QUIGG

Attesting Officer

Commissioner of Patents and Trademarks